US008082156B2

(12) United States Patent
Shimada

(10) Patent No.: US 8,082,156 B2

(45) Date of Patent: Dec. 20, 2011

(54) AUDIO ENCODING DEVICE, AUDIO ENCODING METHOD, AND AUDIO ENCODING PROGRAM FOR ENCODING A WIDE-BAND AUDIO SIGNAL

(75) Inventor: Osamu Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 1045 days.

(21) Appl. No.: 11/794,984

(22) PCT Filed: Jan. 6, 2006

(86) PCT No.: PCT/JP2006/000112

§ 371 (c)(1),
(2), (4) Date: Jul. 10, 2007

(87) PCT Pub. No.: WO2006/075563

PCT Pub. Date: Jul. 20, 2006

(65) Prior Publication Data

US 2008/0140425 A1 Jun. 12, 2008

(30) Foreign Application Priority Data

Jan. 11, 2005 (JP) ................................ 2005-003291

(51) Int. Cl.
*G01L 19/00* (2006.01)

(52) U.S. Cl. ........................................................ 704/500

(58) Field of Classification Search ................... 704/500
See application file for complete search history.

(56) References Cited

U.S. PATENT DOCUMENTS 5,586,193 A * 12/1996 Ichise et al. ................... 381/106
5,819,212 A 10/1998 Matsumoto et al.
6,449,596 B1 9/2002 Ejima
6,680,972 B1 1/2004 Liljeryd et al.
6,708,145 B1 3/2004 Liljeryd et al.
7,058,571 B2 * 6/2006 Tsushima et al. ............. 704/225
7,069,212 B2 * 6/2006 Tanaka et al. ................. 704/225
7,205,910 B2 * 4/2007 Honma et al. .................. 341/50
7,333,929 B1 * 2/2008 Chmounk et al. ............ 704/200

(Continued)

FOREIGN PATENT DOCUMENTS

JP 5-37395 (A) 2/1993

(Continued)

OTHER PUBLICATIONS

Universal Mobile Telecommunications Systems (UMTS); General adio codec audio processing functions; Enhanced aacPlus general audio codec; Encoder specification; Spectral Band Replication (SBR) part (3GPP TS 26.404 version 6.0.0 Release 6); ETSI TS 126 404 Sep. 2004, XP014027781, 36 pp.

(Continued)

*Primary Examiner* — Susan McFadden

(74) *Attorney, Agent, or Firm* — Foley & Lardner LLP

(57) ABSTRACT

By using a high-range sub-band signal, a correction coefficient corresponding to importance of auditory sense is calculated to correct a noise level and generate additional signal information, thereby accurately reflecting the noise level of the sub-band important in the auditory sense. Thus, it is possible to calculate additional signal information reflecting the noise level of the sub-band important in the auditory sense according to importance with a small calculation amount. The calculation amount can further be reduced by using a correction coefficient based on the characteristic of an ordinary audio signal.

13 Claims, 7 Drawing Sheets

U.S. PATENT DOCUMENTS

| | | | | |
|---|---|---|---|---|
| 7,489,788 | B2 * | 2/2009 | Leung et al. | 381/92 |
| 7,613,603 | B2 * | 11/2009 | Yamashita | 704/200.1 |
| 7,805,293 | B2 * | 9/2010 | Takada et al. | 704/205 |

FOREIGN PATENT DOCUMENTS

| | | |
|---|---|---|
| JP | 5-313694 | 11/1993 |
| JP | 6-259094 | 9/1994 |
| JP | 9-127986 | 5/1997 |
| JP | 9-261066 | 10/1997 |
| JP | 11-514453 | 12/1999 |
| JP | 2001-521648 (A) | 11/2001 |
| JP | 2002-536679 A | 10/2002 |
| JP | 2003-216190 (A) | 7/2003 |
| WO | WO 03/046891 A1 | 6/2003 |

OTHER PUBLICATIONS

K. Kjörling et al., International Organisation for Standardisation Organisation Internationale de Normalisation ISO/IEC JTC1/SC29/WG11 Coding of Moving Pictures and Audio, Mar. 2002, XP030037009, pp. 1-71.

"Digital Radio Mondiale (DRM); System Specification," ETSI, TS 101 980 V1.1.1, paragraph 5.2.6, Sep. 2001, pp. 42-67.

AES (Audio Engineering Society) Convention Paper 5553, 112$^{th}$ AES Convention, May 2002, pp. 1-8.

"Enhanced aacPlus general audio codec; Enhanced aacPlus encoder SBR part," 3GPP, TS 26.404, V6.0.0, Sep. 2004, pp. 1-34.

* cited by examiner

AUDIO ENCODING DEVICE, AUDIO ENCODING METHOD, AND AUDIO ENCODING PROGRAM FOR ENCODING A WIDE-BAND AUDIO SIGNAL

APPLICABLE FIELD IN THE INDUSTRY

The present invention relates to an audio encoding device, an audio encoding method, and an audio encoding program, and more particularly to an audio encoding device, an audio encoding method, and an audio encoding program that allow a wide-band audio signal to be encoded with a small information amount at a high quality.

BACKGROUND ART

The method of utilizing band division encoding is widely known as a technology capable of encoding an ordinary acoustic signal with a small information amount, and yet obtaining a reproduction signal with a high quality. As a representative example of the encoding utilizing such a band division, there exists MPEG-2AAC (Moving Experts Group 2 Advance Audio Coding), being ISO/IEC International Standard, in which a wide-band stereo signal of 16 kHz or more can be encoded in a bit rate of 96 kbps or so at a high quality.

However, in a case of having lowered the bit rate, for example, to an extent of 48 kbps, the band enabling the acoustic signal to be encoded at a high quality becomes 10 kHz or so, or less, and the sound is reproduced of which a high-frequency-band signal component is subjectively insufficient in an auditory sense. As a method of compensating a deterioration of a sound quality due to such a band restriction, there exists, for example, the technology described in Non-patent document 1, which is called SBR (Spectral Band Replication). The similar technology is disclosed, for example, in Non-patent document 2 as well.

The SBR aims at compensating the signal of a high-frequency band (high-frequency-band component) that is lost due to an audio encoding process such as the AAC or a band restriction process according hereto, whereby the signal of a frequency band (low-frequency-band component) of which the frequency is lower than that of the band that is compensated by the SBR has to be transmitted by employing another means. Information for generating a pseudo-component of a high-frequency band based upon the low-frequency-band component that is transmitted by employing another means is included in the information encoded by the SBR, and adding the pseudo-component of a high-frequency-band to the low-frequency-band component allows a deterioration of a sound quality due to the band restriction to be compensated.

Hereinafter, an operation of the SBR will be explained in details by making a reference to FIG. 6. FIG. 6 is a view illustrating one example of a band expansion encoding/decoding device employing the SBR. The encoding side is configured of an input signal division unit 100, a low-frequency-band component encoding unit 101, a high-frequency-band component encoding unit 102, and a bit stream multiplexing unit 103, and the decoding side is configured of a bit stream separation unit 200, a low-frequency-band component decoding unit 201, a sub-band division unit 202, a band expansion unit 203, and a sub-band synthesization unit 204.

In the encoding side, the input signal division unit 100 analyzes an input signal 1000, and outputs a high-frequency-band sub-band signal 1001 divided into a plurality of high-frequency bands, and a low-frequency-band signal 1002 including a low-frequency-band component. The low-frequency-band signal 1002 is encoded by the low-frequency-band component encoding unit 101 into low-frequency-band component information 1004 by employing the foregoing encoding technique such as the AAC, which is transmitted to the bit stream multiplexing unit 103. Further, the high-frequency-band component encoding unit 102 extracts high-frequency-band energy information 1102 and additional signal information 1103 from the high-frequency-band sub-band signal 1001, and transmits them to the bit stream multiplexing unit 103. The bit stream multiplexing unit 103 multiplexes high-frequency-band component information that is configured of the low-frequency-band component information 1004, the high-frequency-band energy information 1102, and the additional signal information 1103, and outputs it as a multiplexing bit stream 1005.

Herein, the high-frequency-band energy information 1102 and the additional signal information 1103 are calculated, for example, in a frame unit sub-band by sub-band. By taking characteristics in a time direction and a frequency direction of the input signal 1000 into consideration, both may be calculated in a time unit obtained by further subdividing the frame in terms of the time direction, and in a band unit obtained by collecting a plurality of the sub-bands in terms of the frequency direction. Calculating the high-frequency-band energy information 1102 and the additional signal information 1103 in a time unit obtained by further subdividing the time-direction frame makes it possible to more detailedly signify a change with a time in the high-frequency-band sub-band signal 1001. Calculating the high-frequency-band energy information 1102 and the additional signal information 1103 in a band unit obtained by collecting a plurality of the sub-bands makes it possible to reduce the total number of the bits necessary for encoding the high-frequency-band energy information 1102 and the additional signal information 1103. The division unit in the time direction and the frequency direction that is utilized for calculating the high-frequency-band energy information 1102 and the additional signal information 1103 is referred to as a time/frequency grid, and its information is included in the high-frequency-band energy information 1102 and the additional signal information 1103.

In such a configuration, the information that is included in the high-frequency-band energy information 1102 and the additional signal information 1103 is only high-frequency-band energy information and additional signal information. For this, it demands only a small information amount (total bit number) as compared with low-frequency-band component information including waveform information and spectrum information of a narrow-band signal. Thus, it is suitable for low-bit-rate encoding of a wide-band signal.

In the decoding side, the multiplexing bit stream 1005 is separated into low-frequency-band component information 1007, high-frequency-band energy information 1105, and additional signal information 1106 in the bit stream separation unit 200. The low-frequency-band component information 1007, which is, for example, information encoded by employing the encoding technique such as the AAC, is decoded in the low-frequency-band component decoding unit 201, and a low-frequency-band component decoding signal 1008 signifying the low-frequency-band component is generated. The low-frequency-band component decoding signal 1008 is divided into low-frequency-band sub-band signals 1009 in the sub-band division unit 202, which are input into the band expansion unit 203. The low-frequency-band sub-band signal 1009 is simultaneously supplied to the sub-band synthesization unit 204 as well. The band expansion unit 203 copies the low-frequency-band sub-band signal 1009 into a high-frequency band sub-band, thereby to reproduce the high-frequency-band component lost due to the band restriction.

Energy information of the high-frequency-band sub-band being reproduced is included in the high-frequency-band energy information 1105 being input into the band expansion unit 203. It is utilized as a high-frequency-band component after employing the high-frequency-band energy information 1105 to regulate energy of the low-frequency-band sub-band signal 1009. Further, the band expansion unit 203 generates an additional signal according to the additional signal information that is included in the additional signal information 1106. Herein, a sine-wave tone signal or a noise signal is employed as an additional signal being generated. The band expansion unit 203 adds the foregoing additional signal to the high-frequency-band component for which the energy regulation has been made, and supplies it as a high-frequency-band sub-band signal 1010 to the sub-band synthesization unit 204. The sub-band synthesization unit 204 band-synthesizes the low-frequency-band sub-band signal 1009 supplied from the sub-band division unit 202, and the high-frequency-band sub-band signal 1010 supplied from the band expansion unit 203, and generates an output signal 1011.

Herein, an operation of the energy regulation in the band expansion unit 203 will be explained in details. The band expansion unit 203 regulates a gain of the copied low-frequency-band sub-band signal 1009 and the additional signal, then adds it to the high-frequency-band component for which the energy regulation has been made, and generates the high-frequency-band sub-band signal 1010 so that energy of the high-frequency-band sub-band signal 1010 assumes an energy value (hereinafter, referred to as target energy) that the high-frequency-band energy information 1105 signifies. The gain of the copied low-frequency-band sub-band signal 1009 and the additional signal can be decided, for example, with the following procedure.

At first, it is assumed that one of the copied low-frequency-band sub-band signal 1009 and the additional signal is a main component of the high-frequency-band sub-band signal 1010, and the other is a subsidiary component. In a case where the low-frequency-band sub-band signal 1009 is a main component and the additional signal is a subsidiary component, the gain is decided by the following equation.

$$G_{main}=\mathrm{sqrt}(R/E/(1+Q))$$

$$G_{sub}=\mathrm{sqrt}(R*Q/N(1+Q))$$

Where $G_{main}$ and $G_{sub}$ signify a gain for regulating an amplitude of the main component and a gain for regulating an amplitude of the subsidiary component, respectively, and E and N signify energy of the low-frequency-band sub-band signal 1009 and energy of the additional signal, respectively. In a case where the energy of the additional signal has been normalized to 1 (one), it is assumed that N=1. Further, R signifies target energy of the high-frequency-band sub-band signal 1010, Q signifies an energy ratio of the main component and the subsidiary component, and R and Q are included in the high-frequency-band energy information 1105 and the additional signal information 1106. Additionally, assume that sqrt (•) is an operator for obtaining a square root. On the other hand, in a case where the additional signal is a main component and the low-frequency-band sub-band signal 1009 is a subsidiary component, the gain is decided by the following equation.

$$G_{main}=\mathrm{sqrt}(R/N/(1+Q))$$

$$G_{sub}=\mathrm{sqrt}(R*Q/E/(1+Q))$$

The band expansion unit 203 employs the gain calculated in the above procedure to operate a weighting addition for the low-frequency-band sub-band signal 1009 and the additional signal, and calculates the high-frequency-band sub-band signal 1010.

Encoding the audio signal at a high quality in a low bit rate necessitates compressing the high-frequency-band component into a component of which information amount is small. Thus, it becomes important to extract the exact high-frequency-band energy information 1102 and additional signal information 1103 in the high-frequency-band component encoding unit 102. For example, in a case of encoding a signal in which a noise level of the high-frequency-band component is higher than that of the low-frequency-band component, as is the case of a signal of a stringed instrument, adding a noise signal of an appropriate magnitude to the signal obtained by copying the low-frequency-band sub-band signal 1009 into the high-frequency band makes it possible to enhance a quality. So as to add a noise signal of an appropriate magnitude in the decoding side, it is necessary in the encoding side to incorporate a precise energy ratio Q of the low-frequency-band sub-band signal 1009 and the noise signal being added into the additional signal information 1103 being generated. For this, the noise level of the high-frequency-band component in the input signal has to be precisely calculated in the high-frequency-band component encoding unit 102.

A first conventional example of the high-frequency-band component encoding unit 102 for calculating a noise level of the high-frequency-band component is disclosed in Non-patent document 3. The high-frequency-band component encoding unit shown in FIG. 7 is configured of a time/frequency grid generation unit 300, a spectrum envelope calculation unit 301, and a noise level calculation unit 302, and a noise level unification unit 303.

The time/frequency grid generation unit 300 employs the high-frequency-band sub-band signal 1001, groups a plurality of the sub-band signals in the time direction and the frequency direction, and generates time/frequency grid information 1100. The spectrum envelope calculation unit 301 extracts target energy R of the high-frequency-band sub-band signal in a time/frequency grid unit, and supplies it as high-frequency-band energy information 1102 to the bit stream multiplexing unit 103. The noise level calculation unit 302 outputs a ratio of the noise component that is included in the sub-band signal as a noise level 1101 in each sub-band unit. The noise level unification unit 303 employs an average of the foregoing noise levels in a plurality of the sub-bands, obtains additional signal information 1103 signifying the foregoing energy ratio Q in a time/frequency grid unit, and supplies it the bit stream multiplexing unit 103.

The method of employing a prediction residual is known as a method of calculating the noise level 1101 in the noise level calculation unit 302, and a noise level T(k) of a sub-band k can be calculated according to the following equation.

$$T(k)=\frac{\sum_{l}|Y(k,l)|^2}{\sum_{l}|X(k,l)|^2-\sum_{l}|Y(k,l)|^2} \quad \text{[Numerical equation 1]}$$

where (k, 1) and Y(k, 1) signify a sub-band signal of the sub-band k, and a prediction sub-band signal, respectively. The method of making a linear prediction by employing a covariance method or an autocorrelation method is known as a method of calculating the prediction sub-band signal. When a small amount of the noise component is included in the sub-band signal, a difference between a sub-band signal X and a prediction sub-band signal Y becomes small, and the value of the noise level T(k) becomes large. Contrarily, when a large amount of the noise component is included, a difference between a sub-band signal X and a prediction sub-band signal Y becomes large, and the value of the noise level T(k) becomes small. In such a manner, the noise level T(k) can be calculated based upon magnitude of the noise component that is included in the sub-band signal.

The noise level unification unit 303 calculates an energy ratio Q of the low-frequency-band sub-band signal and the noise signal in a unit of a plurality of the sub-bands based upon the time/frequency grid information 1100. The reason is that calculating an energy ratio Q in a unit of a plurality of the sub-bands rather than calculating an energy ratio Q in a unit of each sub-band enables the bit number necessary for the additional signal information 1103 to be curtailed all the more. For example, now think about the case of signifying N sub-bands of a sub-band $k_0$ to a sub-band $k_0+N-1$ with an identical energy ratio Q (fNoise). The additional signal information 1103 is calculated by averaging the noise levels 1101 of N sub-bands of a sub-band $k_0$ to a sub-band $k_0+N-1$. Q (fNoise) is expressed by the following equation.

$$Q(fNoise) = c \cdot \frac{N}{\sum_{p=k_0}^{k_0+N-1} T_1(k)} \quad \text{[Numerical equation 2]}$$

where fNoise signifies a frequency number of the additional signal information 1103, and c is a constant.

As a second conventional example of the high-frequency-band component encoding unit 102 for calculating a noise level of the high-frequency-band component, there exists the method disclosed in Patent document 1. In the second conventional example, a difference between a maximum value and a minimum value of a spectrum envelope that is calculated by applying high-resolution FFT to the input signal, and a result of having smoothed the calculated difference by a time and a frequency is assumed to be a noise level.

Patent document 1: JP-P2002-536679A

Non-patent document 1: "Digital Radio Mondiale (DRM); System Specification", ETSI, TS 101 980 V1.1.1, paragraph 5.2.6, September, 2001

Non-patent document 2: "AES (Audio Engineering Society) Convention Paper 5553", 112$^{th}$ AES Convention, May 2002

Non-patent document 3: "Enhanced aacPlus general audio codec; Enhanced aacPlus encoder SBR part", 3GPP, TS 26.404 V6.0.0, September, 2004

DISCLOSURE OF THE INVENTION

Problems to be Solved by the Invention

The conventional method of calculating addition signal information is a method of averaging the noise levels calculated independently in a unit of each sub-band, whereby a priority degree of auditory sense of the sub-band is not taken into consideration. For this, there exists the problem that the noise level of the sub-band important in the auditory sense is not reflected into the additional signal information according to its importance, and the audio signal encoding device with a high quality cannot be realized.

Further, the method of employing the spectrum envelope to calculate the additional signal information necessitates a high-resolution frequency analysis or a smoothing process, which gives rise to the problem that the operation amount augments. Moreover, there exists the problem as well that the value of the noise level greatly differs depending upon an extent of the smoothing, and it is difficult to optimize the extent of the smoothing.

Thereupon, the present invention has been accomplished in consideration of the above-mentioned problems, and an object thereof is to provide a technology relating to audio signal encoding with a high quality that makes it possible to calculate the additional signal information into which the noise level of the sub-band important in the auditory sense has been reflected responding to importance with a small operation amount.

Means to Solve the Problem

The first invention for solving the above-mentioned problems, which is an audio encoding device, is characterized in including: an input signal division unit for extracting a high-frequency-band signal from an input signal; a first high-frequency-band component encoding unit for extracting a spectrum of the high-frequency-band signal to generate first high-frequency-band component information; a noise level calculation unit for allowing importance of each frequency component to be reflected, thereby to obtain a noise level of the high-frequency-band signal; a second high-frequency-band component encoding unit for employing the noise level to generate second high-frequency-band component information; and a bit stream multiplexing unit for multiplexing the first high-frequency-band component information and the second high-frequency-band component information to output a multiplexing bit stream.

The second invention for solving the above-mentioned problems, which is an audio encoding device, is characterized in including: an input signal division unit for extracting a high-frequency-band signal from an input signal; a first high-frequency-band component encoding unit for extracting a spectrum of the high-frequency-band signal to generate first high-frequency-band component information; a noise level calculation unit for employing the high-frequency-band signal to calculate a noise level; a correction coefficient calculation unit for employing the high-frequency-band signal to calculate a correction coefficient; a noise level correction unit for employing the correction coefficient to correct the noise level, and obtaining a corrected noise level; a second high-frequency-band component encoding unit for employing the corrected noise level to generate second high-frequency-band component information; and a bit stream multiplexing unit for multiplexing the first high-frequency-band component information and the second high-frequency-band component information to output a multiplexing bit stream.

The third invention for solving the above-mentioned problems is characterized in that, in the above-mentioned second invention, the correction coefficient calculation unit calculates a correction coefficient into which importance of each frequency component of the high-frequency-band signal has been reflected.

The fourth invention for solving the above-mentioned problems is characterized in that, in the above-mentioned second invention, the correction coefficient calculation unit calculates energy by frequency bands of the high-frequency-band signal, and calculates a correction coefficient based upon the energy by frequency bands.

The fifth invention for solving the above-mentioned problems is characterized in that, in one of the above-mentioned second invention and third invention, the correction coefficient calculation unit calculates a correction coefficient such that a value of the correction coefficient is small for a high frequency.

The sixth invention for solving the above-mentioned problems is characterized in that, in the above-mentioned first invention, the noise level calculation unit smoothes the noise level obtained by allowing importance of each frequency component of the high-frequency-band signal to be reflected at least in one of a time direction and a frequency direction.

The seventh invention for solving the above-mentioned problems is characterized in that, in one of the above-mentioned second invention to fifth invention, the correction coefficient calculation unit smoothes the correction coefficient calculated responding to each frequency component of the high-frequency-band signal at least in one of a time direction and a frequency direction.

The eighth invention for solving the above-mentioned problems, which is an audio encoding method, is characterized in: extracting a high-frequency-band signal from an input signal; extracting a spectrum of the high-frequency-band signal to generate first high-frequency-band component information; allowing importance of each frequency component to be reflected, thereby to obtain a noise level of the high-frequency-band signal; generating second high-frequency-band component information from the noise level; and multiplexing the first high-frequency-band component information and the second high-frequency-band component information to output a multiplexing bit stream.

The ninth invention for solving the above-mentioned problems, which is an audio encoding method, is characterized in: extracting a high-frequency-band signal from an input signal; extracting a spectrum of the high-frequency-band signal to generate first high-frequency-band component information; employing the high-frequency-band signal to obtain a noise level; employing the high-frequency-band signal to obtain a correction coefficient; employing the correction coefficient to correct the noise level, and obtaining a corrected noise level; employing the corrected noise level to generate second high-frequency-band component information; and multiplexing the first high-frequency-band component information and the second high-frequency-band component information to output a multiplexing bit stream.

The tenth invention for solving the above-mentioned problems is characterized in, in the above-mentioned eighth invention, in obtaining the foregoing correction coefficient, obtaining a correction coefficient responding to importance of auditory sense that corresponds to each frequency component of the high-frequency-band signal.

The eleventh invention for solving the above-mentioned problems is characterized in, in the above-mentioned eighth invention, in obtaining the foregoing correction coefficient, obtaining energy by frequency bands of the high-frequency-band signal, and obtaining a correction coefficient based upon the energy by frequency bands.

The twelfth invention for solving the above-mentioned problems is characterized in, in one of the above-mentioned eighth invention and ninth invention, in obtaining the foregoing correction coefficient, calculating a correction coefficient such that a value of the correction coefficient is small for a high frequency.

The thirteenth invention for solving the above-mentioned problems is characterized in that, in the above-mentioned eighth invention, in obtaining the foregoing noise level, smoothing the noise level obtained by allowing importance of each frequency component of the high-frequency-band signal to be reflected at least in one of a time direction and a frequency direction.

The fourteenth invention for solving the above-mentioned problems is characterized in that, in one of the above-mentioned ninth invention to eleventh invention, in obtaining the foregoing correction coefficient, smoothing the correction coefficient calculated responding to each frequency component of the high-frequency-band signal at least in one of a time direction and a frequency direction.

The fifteenth invention for solving the above-mentioned problems is a program for causing a computer to execute the processes of: extracting a high-frequency-band signal from an input signal; extracting a spectrum of the high-frequency-band signal to generate first high-frequency-band component information; allowing importance of each frequency component to be reflected, thereby to obtain a noise level of the high-frequency-band signal; employing the noise level to generate second high-frequency-band component information; and multiplexing the first high-frequency-band component information and the second high-frequency-band component information to output a multiplexing bit stream.

The present invention is configured to employ the high-frequency-band sub-band signal, to calculate a correction coefficient responding to importance of auditory sense, to correct a noise level, and to generate additional signal information, whereby the noise level of the sub-band important in the auditory sense can be reflected accurately. For this, the audio encoding device with a high quality can be realized.

Further, employing a correction coefficient based upon a characteristic of a general audio signal enables the operation amount to be reduced all the more.

Effects of the Invention

The present invention makes it possible to calculate a correction coefficient based upon importance of auditory sense of an input signal, thereby to correct a noise level of each sub-band.

Further, a normal-resolution frequency analysis is made in calculating the correction coefficient of the present invention, whereby the noise level of the sub-band into which importance of auditory sense has been reflected can be obtained while reducing the operation amount necessary for the high-resolution frequency analysis. As a result, it becomes possible to realize the audio encoding device with a high quality.

DESCRIPTION OF NUMERALS

Figure 1:
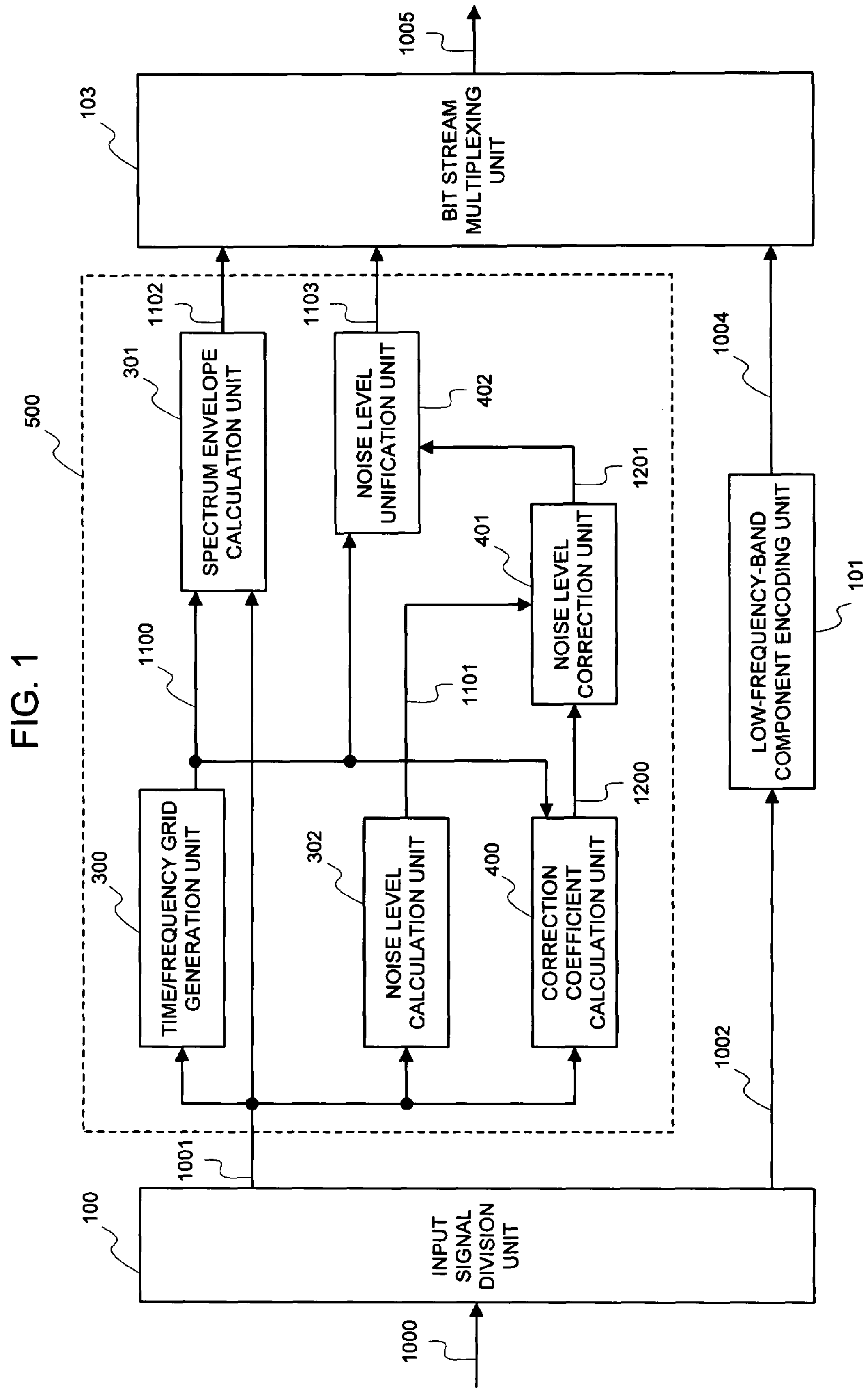
FIG. 1 is a block diagram illustrating a configuration of the best mode for carrying out the first invention of the present invention.

100 input signal division unit
101 low-frequency-band component encoding unit
102, 500, and 501 high-frequency-band component encoding units
103 bit stream multiplexing unit
110 and 202 sub-band division units
111 and 204 sub-band synthesization units
112 down sampling filter
200 bit stream separation unit
201 low-frequency-band component decoding unit
203 band expansion unit
300 time/frequency grid generation unit
301 spectrum envelope calculation unit
302 noise level calculation unit
303 and 402 noise level unification units
400 and 403 correction coefficient calculation units
401 noise level correction unit
1000 input signal
1001 high-frequency-band sub-band signal
1002 low-frequency-band signal
1004 and 1007 low-frequency-band component information
1005 bit stream
1008 low-frequency-band component decoding signal
1009 low-frequency-band sub-band signal
1010 high-frequency-band sub-band signal
1011 band expansion signal
1100 time/frequency grid information
1101 noise level
1102 and 1105 high-frequency-band energy information
1103 and 1106 additional signal information
1200 and 1202 correction coefficients
1201 corrected noise level

BEST MODE FOR CARRYING OUT THE INVENTION

Next, the best mode for carrying out the present invention will be explained by making a reference to the accompanied drawings.

At first, a first embodiment will be explained.

Figure 6:
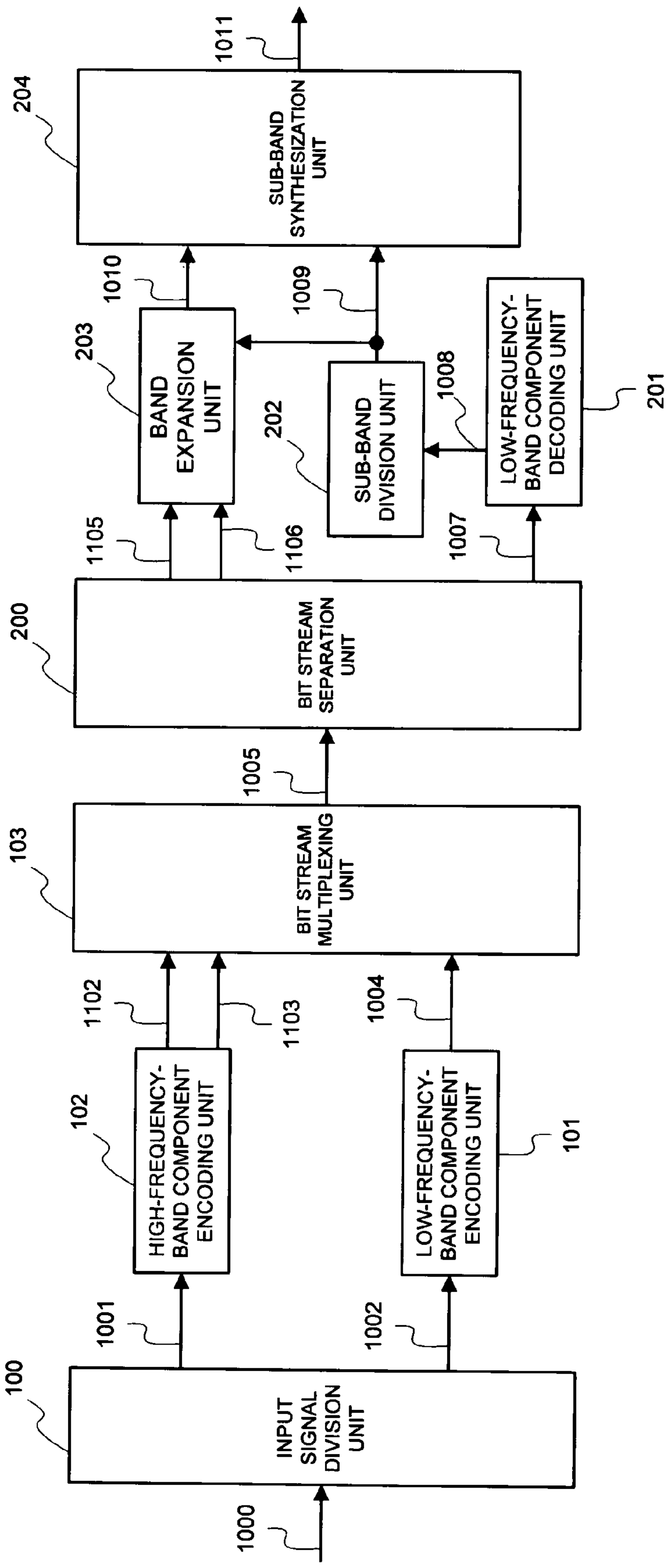
FIG. 6 is a block diagram illustrating the band expansion encoding/decoding device.
Figure 7:
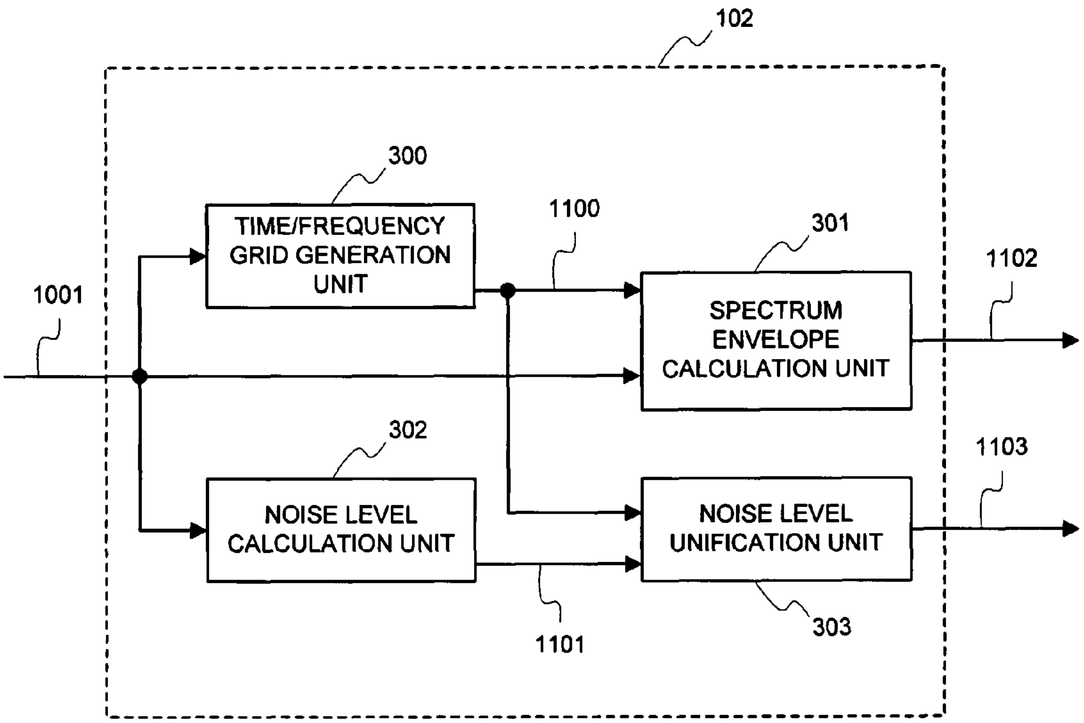
FIG. 7 is a block diagram illustrating a configuration of the high-frequency-band component encoding unit.

Upon making a reference to FIG. 1, the audio encoding device of the first embodiment of the present invention is configured of an input signal division unit 100, a low-frequency-band component encoding unit 101, a time/frequency grid generation unit 300, a spectrum envelope calculation unit 301, a noise level calculation unit 302, a correction coefficient calculation unit 400, a noise level correction unit 401, a noise level unification unit 402, and a bit stream multiplexing unit 103. FIG. 1 and FIG. 6 differ from each other in a high-frequency-band component encoding unit 102 and a high-frequency-band component encoding unit 500. Upon further comparing these components in details by employing FIG. 1 and FIG. 7, the correction coefficient calculation unit 400 and the noise level correction unit 401 are added to the high-frequency-band component encoding unit 500, and the noise level unification unit 300 is replaced by the noise level unification unit 402. Hereinafter, detailed operations of the correction coefficient calculation unit 400, the noise level correction unit 401, the noise level unification unit 402 will be explained.

The time/frequency grid information 1100 obtained in the time/frequency grid generation unit 300 by employing the high-frequency-band sub-band signal 1001 to group a plurality of the sub-band signals in the time direction and the frequency direction is conveyed to the correction coefficient calculation unit 400. The correction coefficient calculation unit 400 employs the high-frequency-band sub-band signal 1001 and the time/frequency grid information 1100 to calculate importance of the auditory sense of each sub-band, and conveys a correction coefficient 1200 of each sub-band to the noise level correction unit 401.

The noise level 1101 as well of each sub-band calculated in the noise level calculation unit 302 by employing the high-frequency-band sub-band signal 1001 is conveyed to the noise level correction unit 401. The noise level correction unit 401 corrects the noise level 1101 of each sub-band based upon the correction coefficient 1200, and outputs a corrected noise level 1201 to the noise level unification unit 402.

The noise level unification unit 402 calculates an average value of the corrected noise levels 1103 in a plurality of the sub-bands based upon the time/frequency grid information 1100. It calculates an energy ratio of the noise component in a time/frequency grid unit, and outputs it as the additional signal information 1103.

Figure 2:
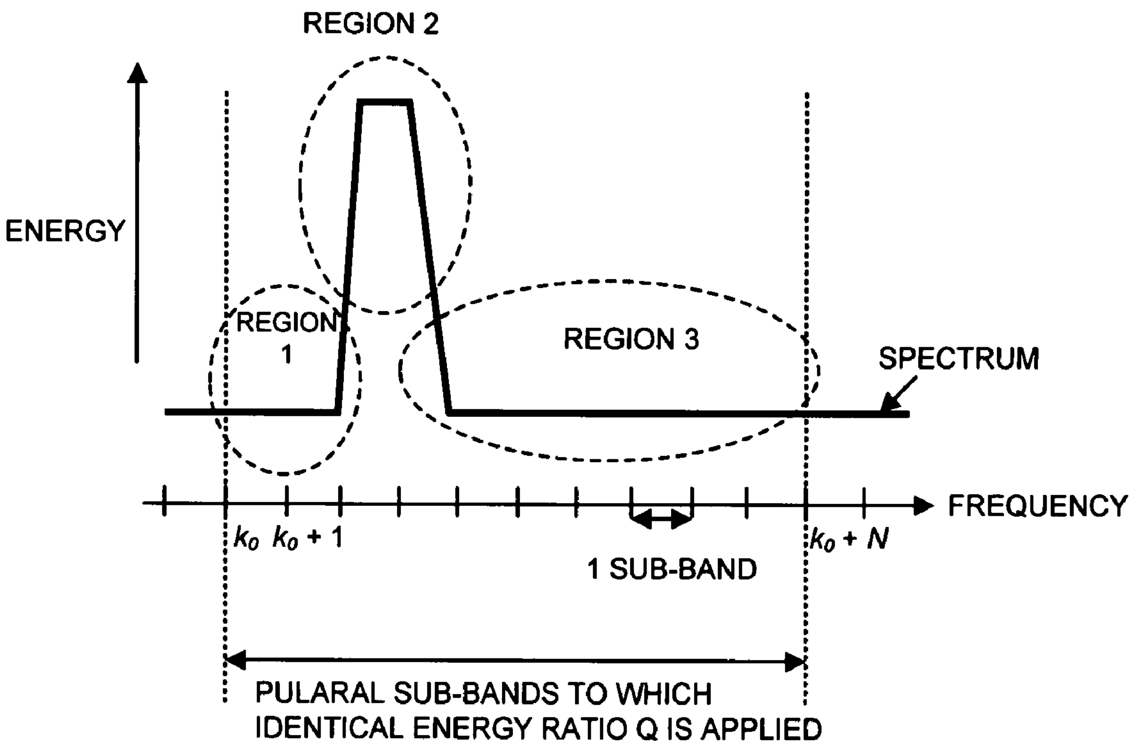
FIG. 2 is an explanatory view illustrating an operational concept of the correction coefficient calculation unit in the present invention.

FIG. 2 signifies one part of the spectrum obtained at the time of having frequency-analyzed the input signal 1000, in which a traverse axis indicates a frequency and a longitudinal axis indicates energy.

In FIG. 2, now think about calculation of the energy ratio Q of the noise signal for N sub-bands of the sub-band $k_0$ to the sub-band $k_0+N-1$, of which the number is 1 (one). This means that an identical energy ratio Q is applied to all of N sub-bands of the sub-band $k_0$ to the sub-band $k_0+N-1$ in the decoding side. Employing a common energy ratio Q for a plurality of the sub-bands in such a manner rather than applying a different energy ratio for each sub-band makes it possible to reduce the bit number necessary for the additional signal information 1103 all the more.

Herein, with the signal having an energy distribution shown in FIG. 2, energy of a region 2 is larger than that of a region 1 or a region 3. The signal of which energy is large is more important in the auditory sense than the signal of which energy is small, whereby the signal of the region 2 has to be encrypted more accurately.

In order to enable the high-quality encoding, the energy ration Q of the noise component in the region 2 has to be reflected into the additional signal information 1103 responding to importance of the region 2. For this, the importance of the auditory sense of each sub-band has to be pre-calculated.

The correction coefficient 1200 signifying the importance of the auditory sense of each sub-band can be calculated, for example, responding to energy of the high-frequency-band sub-band signal 1001. When it is assumed that the energy ratio Q of the noise signal of which the number is one is calculated from N sub-bands of the sub-band $k_0$ to the sub-band $k_0+N-1$, a correction coefficient a(k) of a sub-band k can be expressed, for example, by the following equation.

$$a(k) = \frac{N \cdot E(k)}{\sum_{p=k_0}^{k_0+N-1} E(p)} \quad \text{[Numerical equation 3]}$$

where E signifies energy of each sub-band. Additionally, the energy of each sub-band may be calculated in a unit of the time grid that is included in the time/frequency grid information 1100, and may be calculated by employing the sub-band signal that is included in a plurality of the time grids.

In the foregoing technique, the energy of the high-frequency-band sub-band signal 1001 is employed as it stands; however the value obtained by modifying the energy of the sub-band signal 1101 may be employed. For example, it is widely known that the characteristic of the auditory sense of human being is that the strength of a sound is proportional to a logarithm thereof in terms of perception. For this, for calculating the correction coefficient, it is not that the energy of the sub-band signal is employed as it stands, but that logarithmized energy thereof may be employed. It is also possible to modify the energy by employing not only a mere logarithm, but also a more complicated function or polynomial expression. The polynomial expression for approximating the logarithm, which is one example of these modifications, contributes to a reduction in the operation amount.

Moreover, the characteristic of the auditory sense may be positively employed to calculate the correction coefficient. For example, the correction coefficient also can be calculated that has taken into consideration an influence of simultaneous masking that prevents a small sound existing simultaneously with a large sound to be perceived, or consecutive masking that occurs in a time direction. The sound smaller than a masking threshold cannot be perceived, whereby making the correction coefficient correlatively smaller of the sub-band that can be ignored in terms of the auditory sense enables the correction coefficient to be calculated responding to the importance of the auditory sense. Contrarily, the correction coefficient of the sub-band larger than the masking threshold may be made correlatively larger.

In the explanation made so far, the example was explained of employing the energy of the sub-band to calculate a(k) signifying the correction coefficient 1200. However, apparently, any of the indexes, each of which changes responding to the importance of the auditory sense, may be employed. Further, a(k) signifying the correction coefficient 1200 may be smoothed in the time direction, thereby to avoid a drastic change in the value.

Next, an operation of the noise level correction unit 401 will be explained in details. The noise level correction unit 401 corrects the noise level 1101 of each sub-band calculated in the noise level calculation unit, based upon the correction coefficient 1200 calculated in the correction coefficient calculation unit, and outputs the corrected noise level 1201 to the noise level unification unit 303.

As a method of the correction, for example, a product of the correction coefficient 1200 and the noise level 1101 can be assumed to be the corrected noise level 1201. That is, a corrected noise level $T_2(k)$ is given by the following equation.

$$T_2(k)=a(K)\times T(k)$$

Further, a result of having added a constant to the foregoing product can be assumed to be a corrected noise level. Moreover, the corrected noise level can be defined as an arbitrary function of the correction coefficient 1200 and the noise level 1101.

The noise level unification unit 402 employs the corrected noise level 1201 to calculate the energy ratio Q of the additional signal in a unit of the frequency grid that is included in the time/frequency grid information 1100, and outputs it as the additional signal information 1103. For example, when it is assumed that the energy ratio Q of the noise signal of which the number is one is calculated from N sub-bands of the sub-band $k_0$ to the sub-band $k_0+N-1$, the energy ratio Q employing the corrected noise level $T_2(k)$ is given by the following equation.

$$Q(fNoise)=c\cdot\frac{N}{\sum_{p=k_0}^{k_0+N-1}T_2(k)}$$ [Numerical equation 4]

where fNoise signifies a frequency index of the additional signal information, and c is a constant.

Figure 3:
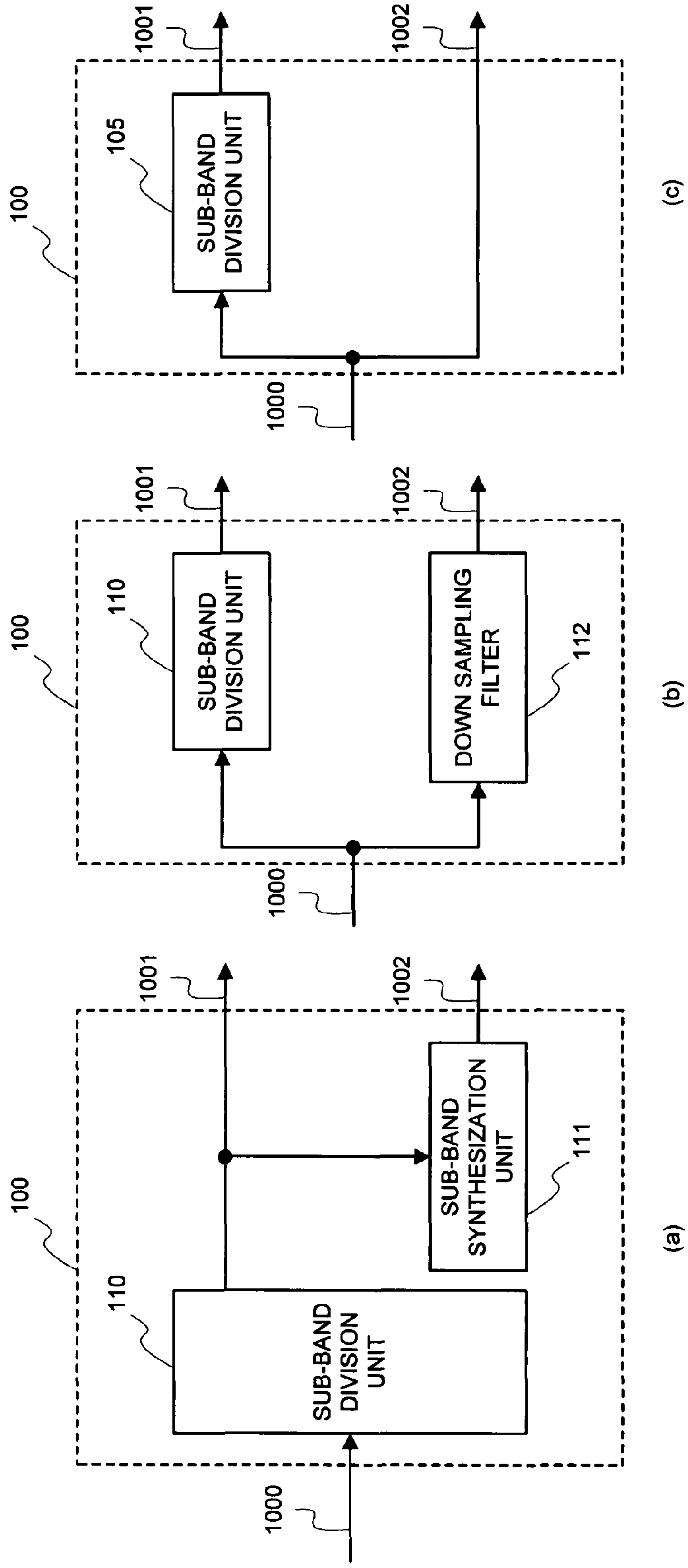
FIG. 3 is a block diagram signifying a configuration of the input signal division unit.

The input signal division unit 100, as shown in FIG. 3(*a*), can be configured of the sub-band division unit 110 and the sub-band synthesization unit 111. The sub-band division unit 110 divides the input signal 1000 into N sub-bands, and outputs the high-frequency-band sub-band signal 1001. The sub-band synthesization unit 111 employs M (M<N) sub-band signals in the low-frequency-bands of the foregoing sub-band signal for subjecting them to the sub-band synthesization, thereby to generate the low-frequency-band signal 1002. As another method of generating the low-frequency-band signal 1002, for example, as shown in FIG. 3(*b*), it is also possible to down-sample the input signal 1000 by employing the down sampling filter 112. The down sampling filter 112, which includes a low-pass filter having a pass band equivalent to the band of the low-frequency-band signal 1002, performs a high-pass suppression process by the low-filter before performing the down sampling process. Further, as shown in FIG. 3(*c*), the input signal 1000 may be output as the low-frequency-band signal 1002 without processing it.

In this embodiment, a configuration is made so that the high-frequency-band sub-band signal 1001 is employed, the correction coefficient 1200 is calculated responding to the importance of the auditory sensed, the noise level 1101 is corrected, and the addition signal information 1103 is generated, whereby the noise level of the sub-band important in the auditory sense can be accurately reflected. For this, the audio encoding device with a high quality can be realized.

Next, a second embodiment of the present invention will be explained in details by employing FIG. 4.

Figure 4:
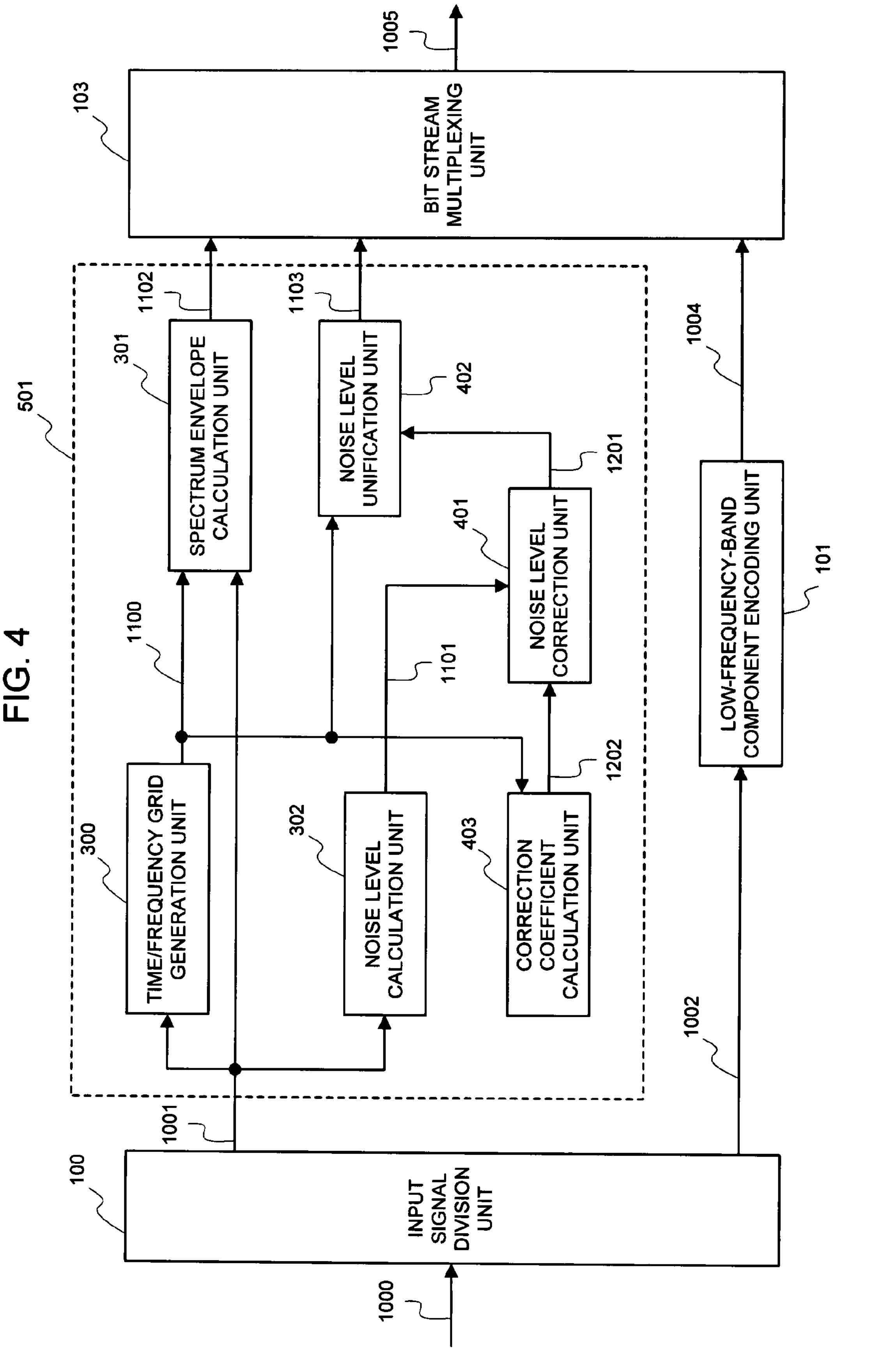
FIG. 4 is a block diagram illustrating a configuration of the best mode for carrying out the second invention of the present invention.

Upon making a reference to FIG. 4, the best mode for carrying out the second invention of the present invention includes an input signal division unit 100, a low-frequency-band component encoding unit 101, a time/frequency grid generation unit 300, a spectrum envelope calculation unit 301, a noise level calculation unit 302, a correction coefficient calculation unit 403, a noise level correction unit 401, a noise level unification unit 402, and a bit stream multiplexing unit 103.

The second embodiment of the present invention differs in only that the correction coefficient calculation unit 400 is replaced with the correction coefficient calculation unit 403 as compared with the first embodiment of the present invention, and the other part thereof is entirely identical. Thereupon, the correction coefficient calculation unit 403 will be explained in details.

The correction coefficient calculation unit 403 calculates the correction coefficient 1202 with a predetermined technique based upon the time/frequency grid information 1100, and outputs it to the noise level correction unit 401.

As a method of calculating the correction coefficient 1202, for example, the method in which the correction coefficient 1202 of which the value is small is given for a high frequency is thinkable. A correspondence relation of the frequency and the correction coefficient 1202 can be decided so that it is expressed by a linear function as a simplest example, or it may be decided so that it is expressed by a non-linear function. The general characteristic of the audio signal is that the signal component of the high frequency has attenuated much more than the signal component of the low frequency in most cases, whereby employing the foregoing method makes it possible to calculate the additional signal information 1103 with a high quality.

This embodiment, which employs the correction coefficient 1202 based upon the characteristic of the general audio signal, can reduce the operation amount all the more as compared with the first embodiment of the present invention.

Next, a third embodiment of the present invention will be explained in details by making a reference to the accompanied drawings.

Figure 5:
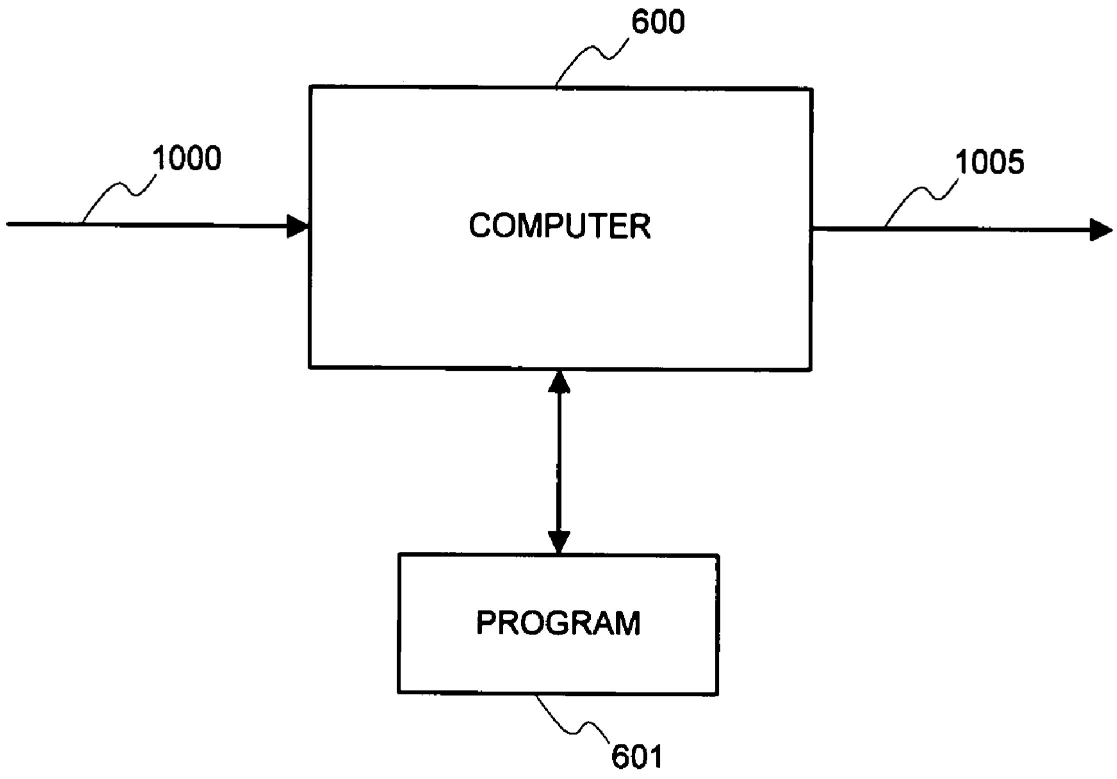
FIG. 5 is a block diagram illustrating a configuration of the best mode for carrying out the third invention of the present invention.

Upon making a reference to FIG. 5, in the case of having configured the foregoing first and second embodiments of the present invention with a program 601, the third embodiment of the present invention is equivalent to a configuration of a computer 600 that operates under its program 601.

The program 601, which is loaded into the computer 600 (central processing unit; a processor; a data processing unit), controls an operation of the computer 600 (central processing unit; a processor; a data processing unit). The computer 600 (central processing unit; a processor; a data processing unit) executes the process identical to the process explained in the foregoing first and second inventions of the present invention under a control of the program 601, and outputs the bit stream 1005 from the input signal 1000.

Additionally, it will be appreciated by those skilled in the relevant field that present invention is not limited to each of the above-mentioned embodiments, and each embodiment can be modified appropriately within the spirit and scope of the present invention.

The invention claimed is:

1. An audio encoding device for dividing an input signal into a low-frequency-band signal having a low frequency band and a high-frequency-band signal having a high frequency band, mixing a signal obtained by converting said low-frequency-band signal and a noise signal, and encoding noise signal information that is used in expressing the high-frequency-band signal, comprising:

- an importance calculation unit for calculating energy of said high-frequency-band signal for each high-frequency band and calculating a correction coefficient such that a value of the correction coefficient is small for a high frequency band based upon said energy for each high-frequency band; and
- a noise signal information correction unit for correcting said noise signal information based upon said correction coefficient for each high-frequency band using a processor.

2. The audio encoding device according to claim 1, further comprising a noise signal information integration unit for integrating said corrected noise signal information for each high-frequency band and calculating the noise signal information that is used in common in a plurality of the frequency bands.

3. The audio encoding device according to claim 1, wherein said importance calculation unit smoothes the correction coefficient of said high-frequency-band signal for each high-frequency band at least in one of a time direction and a frequency direction.

4. The audio encoding device according to claim 1, wherein said noise signal information is a noise level indicating a ratio of the noise signal over said high-frequency-band signal.

5. The audio encoding device according to claim 1, further comprising smoothing the correction coefficient calculated responding to each frequency component of said high-frequency-band signal at least in one of a time direction and a frequency direction.

6. The audio encoding device according to claim 1, wherein said noise signal information is a noise level indicating a ratio of the noise signal over said high-frequency-band signal.

7. An audio encoding method for dividing an input signal into a low-frequency-band signal having a low frequency band and a high-frequency-band signal having a high frequency band, mixing a signal obtained by converting said low-frequency-band signal and a noise signal, and encoding noise signal information that is used in expressing the high-frequency-band signal, comprising the steps of:

- calculating energy of said high-frequency-band signal for each high-frequency band;
- calculating a correction coefficient such that a value of the correction coefficient is small for a high-frequency band based upon said energy for each high-frequency band; and
- correcting said noise signal information based upon said correction coefficient for each high-frequency band using a processor.

8. The audio encoding method according to claim 7, further comprising integrating said corrected noise signal information for each high-frequency band and calculating the noise signal information that is used in common in a plurality of the frequency bands.

9. The audio encoding method according to claim 7 wherein said calculating step smoothes the correction coefficient of said high-frequency-band signal for each high-frequency band at least in one of a time direction and a frequency direction.

10. The audio encoding method according to claim 7, wherein said noise signal information is a noise level indicating a ratio of the noise signal over said high-frequency-band signal.

11. The audio encoding method according to claim 7, further comprising smoothing the correction coefficient calculated responding to each frequency component of said high-frequency-band signal at least in one of a time direction and a frequency direction.

12. The audio encoding method according to claim 7, wherein said noise signal information is a noise level indicating a ratio of the noise signal over said high-frequency-band signal.

13. A non-transitory computer-readable medium having stored thereon an audio encoding program for dividing an input signal into a low-frequency-band signal having a low frequency band and a high-frequency-band signal having a high frequency band, mixing a signal obtained by converting said low-frequency-band signal and a noise signal, and encoding noise signal information that is used in expressing the high-frequency-band signal, the audio encoding program having computer-executable instructions for performing a method comprising:

- calculating energy of said high-frequency-band signal for each high-frequency band;
- calculating a correction coefficient such that a value of the correction coefficient is small for a high-frequency band based upon said energy for each high-frequency band; and
- correcting said noise signal information based upon said correction coefficient for each high-frequency band using a processor.

* * * * *